US011065694B2

(12) United States Patent
Hartnagel et al.

(10) Patent No.: US 11,065,694 B2
(45) Date of Patent: Jul. 20, 2021

(54) ALIGNMENT SYSTEM, DRILLING SYSTEM, AND METHOD FOR DRILLING A HOLE THROUGH A GANG CHANNEL

(71) Applicant: The Boeing Company, Chicago, IL (US)

(72) Inventors: Trevor A. Hartnagel, Chicago, IL (US); Steven L. Guynn, Chicago, IL (US); Daniel C. Forbes, Chicago, IL (US); Steven H. Jones, Chicago, IL (US)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 15/875,473

(22) Filed: Jan. 19, 2018

(65) Prior Publication Data

US 2019/0224758 A1 Jul. 25, 2019

(51) Int. Cl.
*B23B 45/00* (2006.01)
*B23B 47/28* (2006.01)
*B23B 35/00* (2006.01)

(52) U.S. Cl.
CPC ............ *B23B 45/003* (2013.01); *B23B 35/00* (2013.01); *B23B 47/28* (2013.01); *B23B 2247/12* (2013.01)

(58) Field of Classification Search
CPC ..... B23B 45/003; B23B 47/28; B23B 47/287; B23B 2247/12; B25H 1/0078
See application file for complete search history.

(56) References Cited

U.S. PATENT DOCUMENTS

| 69,644 A | * | 10/1867 | Driggs | ................... B23B 47/28 408/104 |
| 128,071 A | * | 6/1872 | Robinson | ................ B23B 47/28 408/104 |

(Continued)

FOREIGN PATENT DOCUMENTS

| CH | 202289 A | * | 1/1939 | ............. B23B 47/28 |
| DE | 2032026 A1 | * | 1/1972 | ............. B23B 47/28 |

(Continued)

OTHER PUBLICATIONS

Description CH202289 (translation) obtained at https://worldwide.espacenet.com/ (last visited Sep. 18, 2019).*

(Continued)

*Primary Examiner* — Ryan Rufo
(74) *Attorney, Agent, or Firm* — McDonnell Boehnen Hulbert & Berghoff LLP

(57) ABSTRACT

Example alignment systems for aligning a drill bit with respect to a gang channel and methods of use are described herein. An example alignment system for use with a drill includes a drill block having a guide portion and an attachment portion. The attachment portion is configured to be removably coupled to a foot of the drill such that the drill block is positioned between the foot and a drill bit of the drill. A longitudinal axis of the drill block is coaxial with a longitudinal axis of the drill bit when the attachment portion is coupled to the foot. The guide portion is configured to at least partially contact an inner surface of opposing legs of a gang channel to thereby center the drill bit between the opposing legs of the gang channel.

13 Claims, 15 Drawing Sheets

(56) References Cited

U.S. PATENT DOCUMENTS

| | | | | |
|---|---|---|---|---|
| 1,507,394 A * | 9/1924 | Meinersmann | B23B 41/00 | 408/1 R |
| 2,029,650 A * | 2/1936 | Betz | B23B 47/28 | 408/115 R |
| 2,033,303 A * | 3/1936 | Ross | B23B 47/28 | 269/207 |
| 2,299,158 A | 10/1942 | Luce | | |
| 2,384,729 A * | 9/1945 | Darby | F16B 37/044 | 411/85 |
| 2,418,956 A * | 4/1947 | Silver | B23B 47/281 | 408/97 |
| 2,429,833 A * | 10/1947 | Luce | F16B 37/045 | 411/84 |
| 2,455,145 A * | 11/1948 | Arent | F16B 37/044 | 411/85 |
| 2,674,906 A * | 4/1954 | Timpner | B23B 35/00 | 408/112 |
| 2,727,412 A * | 12/1955 | Hatcher | B25H 1/0078 | 408/235 |
| 2,837,939 A * | 6/1958 | Leitner | B25H 1/0078 | 408/110 |
| 2,879,820 A | 3/1959 | Trzcinski | | |
| 2,925,001 A * | 2/1960 | Johnson | B27C 3/08 | 408/99 |
| 3,046,817 A * | 7/1962 | Schwable | B25H 1/0078 | 408/110 |
| 3,260,138 A * | 7/1966 | Kenneth | B25H 1/0057 | 408/99 |
| 3,386,318 A * | 6/1968 | Pekarcik | B23B 49/026 | 408/97 |
| 3,538,794 A * | 11/1970 | Grundmeyer | B25H 1/0057 | 408/92 |
| 3,729,809 A | 5/1973 | Vawter et al. | | |
| 3,746,460 A * | 7/1973 | Lipe | B25H 1/0078 | 408/112 |
| 4,072,440 A * | 2/1978 | Glover | B25H 1/0078 | 408/112 |
| 4,445,264 A * | 5/1984 | Banerian | B21D 22/04 | 29/445 |
| 4,474,514 A * | 10/1984 | Jensen | B23B 47/287 | 408/115 B |
| 4,729,698 A * | 3/1988 | Haddon | B25F 3/00 | 144/106 |
| 4,948,308 A * | 8/1990 | Giannuzzi | B25B 5/061 | 408/103 |
| 5,131,793 A * | 7/1992 | Luebbert | B23B 47/28 | 408/101 |
| 5,214,837 A | 6/1993 | Stafford | | |
| 5,308,199 A * | 5/1994 | Juang | B23B 47/287 | 408/103 |
| 5,314,271 A * | 5/1994 | Christiano | B25H 1/0057 | 408/111 |
| 6,776,562 B2 * | 8/2004 | Morrison | B23B 49/026 | 408/130 |
| 7,226,252 B2 * | 6/2007 | Glodowski | B25H 1/0064 | 408/1 R |
| 10,195,674 B1 * | 2/2019 | Couvertier, II | E05D 11/0009 | |
| 10,239,130 B1 * | 3/2019 | Dye | B23B 49/023 | |
| 2003/0068207 A1 * | 4/2003 | Sarh | B23B 47/28 | 408/1 R |
| 2009/0036281 A1 * | 2/2009 | Piggott | B23Q 3/103 | 409/132 |
| 2009/0071671 A1 * | 3/2009 | Zhong | B23B 45/008 | 173/176 |
| 2011/0255928 A1 * | 10/2011 | Ferreras | B23B 47/28 | 408/115 B |
| 2013/0189050 A1 * | 7/2013 | James | F16B 37/045 | 411/166 |
| 2017/0197254 A1 * | 7/2017 | Belt | F16N 7/00 | |
| 2018/0304453 A1 * | 10/2018 | Schaer | B25F 5/001 | |

FOREIGN PATENT DOCUMENTS

| | | | | |
|---|---|---|---|---|
| DE | 2555956 A1 * | 6/1977 | | B23B 49/006 |
| DE | 3419984 A1 * | 12/1985 | | B23B 47/287 |
| FR | 2691660 A1 * | 12/1993 | | B25H 1/0078 |
| GB | 134286 A * | 10/1919 | | B23B 47/28 |
| GB | 154073 A * | 11/1920 | | B23B 47/28 |
| GB | 161385 A * | 4/1921 | | B23B 47/28 |
| GB | 645227 A * | 10/1950 | | B23B 47/28 |
| WO | WO-2018208175 A2 * | 11/2018 | | B23B 47/287 |

OTHER PUBLICATIONS

Description DE2555956A1 (translation) obtained at https://worldwide.espacenet.com/ (last visited Jul. 16, 2020).*

Description FR2691660A1 (translation) obtained at https://worldwide.espacenet.com/ (last visited Nov. 23, 2020).*

* cited by examiner

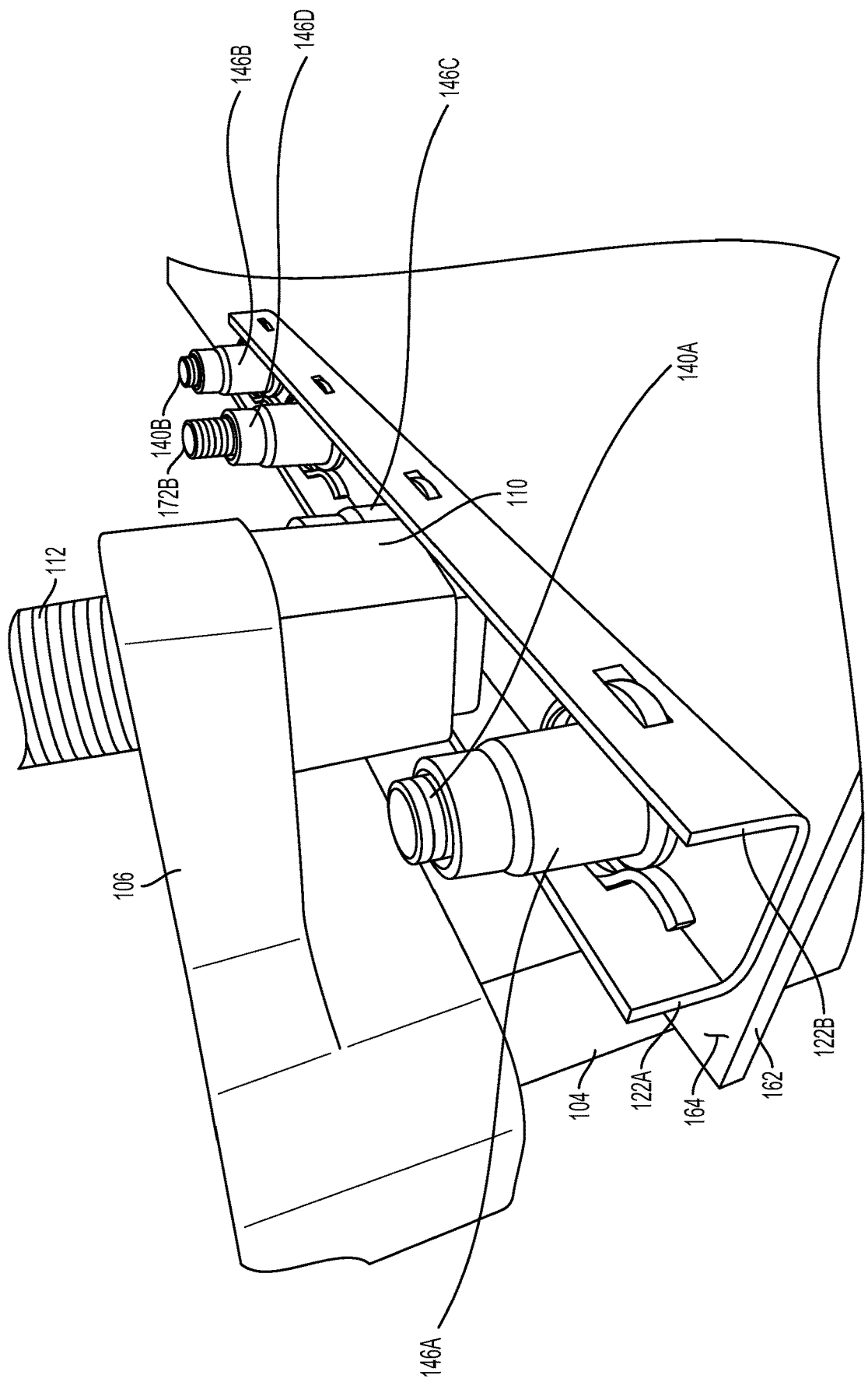

ALIGNMENT SYSTEM, DRILLING SYSTEM, AND METHOD FOR DRILLING A HOLE THROUGH A GANG CHANNEL

FIELD

The present disclosure relates generally to an alignment system for aligning a drill bit of a drill assembly with a gang channel, and corresponding systems and methods for aligning the drill bit of the drill assembly with the gang channel.

BACKGROUND

When making assemblies having removable doors coupled to a larger structure, gang channels (sometimes referred to as "nut plates") are coupled to a sheet of material (such as the skin of the larger structure), such as on the non-visible surface of the skin. For example, aircraft may include assemblies having removable doors coupled to the remainder of the structure using gang channels. Door openings are defined through the skin of the aircraft, and gang channels can be coupled to the non-visible surface of the skin adjacent the edges of the skin defining the door opening. At least some known gang channels include a first series of holes (e.g., rivet attach holes) with a span of the base separating them. These holes are used for fasteners (e.g., rivets or other types of fasteners) to secure the removable door to the aircraft. A second series of holes are drilled through the skin and the span of base of the gang channel to attach the gang channel to the skin. These second holes should be centered between the legs of the gang channel, and preferably may be centered between the larger holes.

The process for attaching a gang channel to the non-visible surface can be time-consuming and difficult to repeat with the same quality every time. For example, it can be difficult to make sure the holes in the base of the gang channel are satisfactorily centered, especially because the gang channel can float on nut plate screws. Even with the drill bushing positioned against the visible surface, the hole may not be exactly perpendicular to the skin and gang channel. Further, many of the locations of the gang channels are located over the operator's head, and drilling with repeatable quality can become difficult, especially later into a shift. Due to the level of skill required by the mechanic to drill centered holes, this drilling operation can be difficult for new mechanic to learn and master.

SUMMARY

In a first aspect, an alignment system for use with a drill is described. The drill includes an arm assembly with a foot extending perpendicular to the arm assembly. The alignment system includes a drill block having a guide portion and an attachment portion. The attachment portion is configured to be removably coupled to the foot such that the drill block is positioned between the foot and a drill bit of the drill. A longitudinal axis of the drill block is coaxial with a longitudinal axis of the drill bit when the attachment portion is coupled to the foot. The guide portion is configured to at least partially contact an inner surface of opposing legs of a gang channel to thereby center the drill bit between the opposing legs of the gang channel.

In a second aspect, a drilling system is described. The drilling system includes a drill comprising a drill bit, an arm assembly, and a foot extending perpendicular to the arm assembly. The drilling system also includes an alignment system comprising a drill block having a guide portion and an attachment portion. The attachment portion is configured to be removably coupled to the foot such that the drill block is positioned between the foot and the drill bit. A longitudinal axis of the drill block is coaxial with a longitudinal axis of the drill bit when the attachment portion is coupled to the foot. The guide portion is configured to at least partially contact an inner surface of opposing legs of a gang channel to thereby center the drill bit between the opposing legs of the gang channel.

In a third aspect, a kit is described. The kit includes a drill block having a guide portion and an attachment portion. The attachment portion is configured to be removably coupled to a foot of a drill such that the drill block is positioned between the foot and a drill bit of the drill. A longitudinal axis of the drill block is coaxial with a longitudinal axis of the drill bit when the attachment portion is coupled to the foot. The guide portion is configured to at least partially contact an inner surface of opposing legs of a gang channel to thereby center the drill bit between the opposing legs of the gang channel. The kit also includes a first alignment pin having a first end and a second end. The first alignment pin includes a first flange positioned between the first end and the second end. The first flange has a greater width than a width of the first end and a width of the second end. The first end is threaded such that the first alignment pin is configured to be removably coupled to a first complementary threaded hole in the gang channel. The kit also includes a second alignment pin having a first end and a second end. The second alignment pin includes a second flange positioned between the first end and the second end. The second flange has a greater width than a width of the first end and a width of the second end. The first end is threaded such that the second alignment pin is configured to be removably coupled to a second complementary threaded hole in the gang channel.

In a fourth aspect, a method for drilling a hole through a gang channel and a workpiece is described. The workpiece includes a first surface and a second surface, and the gang channel includes opposing legs extending from a base. The method includes (a) inserting a first end of a first alignment pin into a first threaded hole of the gang channel, (b) inserting a first end of a second alignment pin into a second threaded hole of the gang channel, (c) positioning a second end of the first alignment pin through a first hole in the workpiece, (d) positioning a second end of the second alignment pin through a second hole in the workpiece, (e) removably coupling the gang channel to the first surface of the workpiece, (f) positioning the workpiece and the gang channel between a drill bit of a drill and a drill block, wherein the drill includes an arm assembly with a foot extending perpendicular to the arm assembly, and wherein the drill block is removably coupled to the foot such that the drill block is positioned between the foot and the drill bit, and wherein a longitudinal axis of the drill block is coaxial with a longitudinal axis of the drill bit when drill block is coupled to the foot, (g) positioning the drill block such that at least a portion of the drill block contacts an inner surface of opposing legs of the gang channel to thereby center the drill bit between the opposing legs of the gang channel, and (h) drilling a hole through the second surface of the workpiece, through the base of the gang channel, and into the drill block.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

FIGS. 11A-11F illustrate the method steps of using the alignment system, according to an example embodiment.

DETAILED DESCRIPTION

Figure 1:
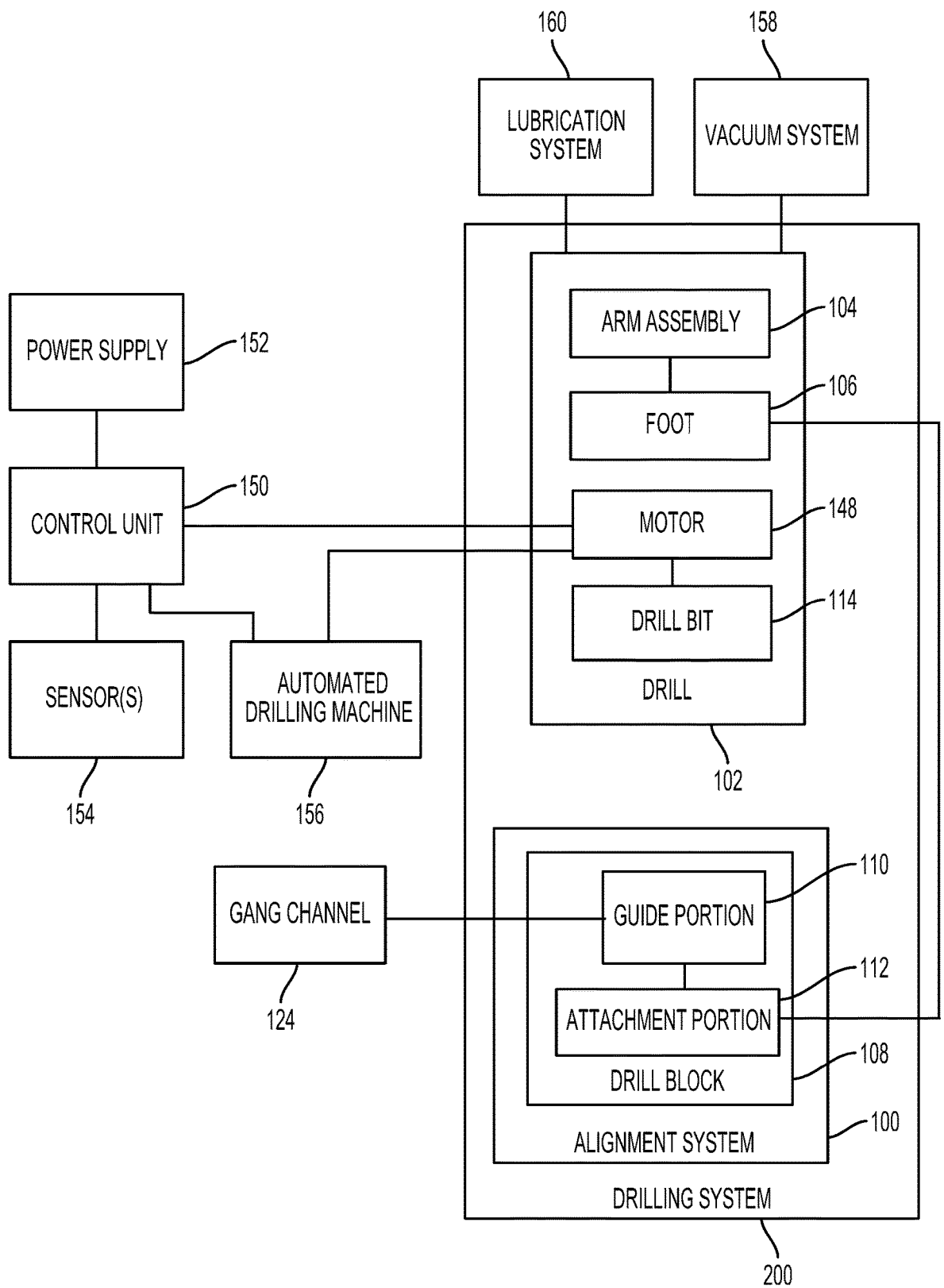
FIG. 1 is a block diagram of an example drilling system including an alignment system, according to an example embodiment.

The present disclosure describes an alignment system for use with a drill. The proposed alignment system and corresponding methods of use can allow a mechanic to repeatedly drill centered, perpendicular holes from a visible surface of a workpiece through a gang channel on the non-visible surface by using a drill block that fits at least partially within the gang channel.

An example drill block includes a guide portion and an attachment portion. The attachment portion is configured to be removably coupled to a foot of an arm assembly such that the drill block is positioned between the foot and a drill bit of the drill. A longitudinal axis of the drill block is coaxial with a longitudinal axis of the drill bit when the attachment portion is coupled to the foot. The guide portion is configured to be at least partially inserted between inner surfaces of opposing legs of a gang channel to thereby center the drill bit between the opposing legs of the gang channel.

Having the drill block positioned at least partially between the legs of the gang channel and not on the surface being drilled can pull the drill bit into perpendicular orientation to the workpiece (and the gang channel) when the drill bit engages the workpiece. Accordingly, the drill block configuration and location assists the mechanic in repeatedly making perpendicular holes with little physical assertion by the mechanic. Such an arrangement may be particularly helpful in securing the gang channel to curved surfaces. The drill block described herein may be a consumable part that is discarded after multiple uses.

As used herein, with respect to measurements, "about" means+/−5%. As used herein, with respect to measurements, "substantially" means+/−5%. As used herein, a "longitudinal axis" of an object includes a long axis of the object; specifically an axis running the length of the object through its center of gravity. As used herein, two axes are "coaxial" when they share a common axis. As used herein, one object is "removably coupled" to another object when the two objects are designed to be detached/uncoupled. As used herein, one object is "permanently fastened" to another object when the two objects are not designed to be detached/uncoupled and will remain connected indefinitely in a secured manner. As used herein, a "hole" is an opening defined by at least one sidewall that extends from a first surface and an opposing second surface of the object. As used herein, a first measurement is "greater than" a second measurement when the first measurement has a greater value than the second measurement. As examples, a first measurement is "greater than" a second measurement when the first measurement is twice as large, 1.5 times as large, at least +/−10% larger, or at least 5% larger.

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art. Illustrative, non-exhaustive examples, which may or may not be claimed, of the subject matter according the present disclosure are provided below. Various other features of the example devices and systems discussed above, as well as methods for using these devices, are also described hereinafter with reference to the accompanying figures.

FIG. 1 is a block diagram of an example drilling system 200 including an example alignment system 100. The drilling system 200 includes a drill 102 including a drill bit 114 and a motor 148 being configured to rotate the drill bit 114. The drill 102 also includes an arm assembly 104 and a foot 106 extending perpendicular to the arm assembly 104. The drilling system 200 also includes an alignment system 100 including a drill block 108 having a guide portion 110 and an attachment portion 112. The attachment portion 112 is configured to be removably coupled to the foot 106 such that the drill block 108 is positioned between the foot 106 and a drill bit 114 of the drill 102.

The motor 148 of the drill 102 may be in communication with a control unit 150, which is further coupled to a power supply 152 and sensor(s) 154. In one embodiment, the control unit 150 is further coupled to an automated drilling machine 156 which, in turn, is coupled to the motor 148. In another embodiment, the control unit 150 may be independently coupled to both the automated drilling machine 156 and the motor 148. In yet another embodiment, the control unit 150 may be coupled to the motor 148 and the automated drilling machine 156 may be absent.

When present, the automated drilling machine 156 may be configured to receive coordinate data from the control unit 150 describing the desired location of a hole to be drilled. The automated drilling machine 156 may be further configured to move the drill bit 114 to the desired hole location. The motor 148 may be configured to move the drill bit 114 in a rotational manner to form a hole in a workpiece. The drill 102 may be coupled to a vacuum system 158 to remove debris from drilling, which can eliminate disassembly and reassembly for cleaning and/or foreign object debris. The drill 102 may also be coupled to a lubrication system 160 so as to provide lubrication to the drilling surface.

The control unit 150 may be configured to operate the drill 102 and to provide power from the power supply 152 to the motor 148 to do so. The control unit 150 may also be configured to operate the automated drilling machine 156 by providing power from the power supply 152 and coordinate data from the sensors 154. The control unit 150 may receive outputs from the sensors 154 to determine when to initiate operation of the drill 102. Thus, within examples, the control unit 150 may include one or more processors and data storage for storing instructions executable by the processors to perform functions of the control unit 150. The sensors 154 may include one or more gyroscopes, one or more accelerometers, one or more magnetometers, one or more light sensors, and/or one or more infrared sensors. The sensors 154 may more generally include sensors for detecting a location of the drill bit 114 with respect to a pilot hole in a drilling surface.

Figure 2:
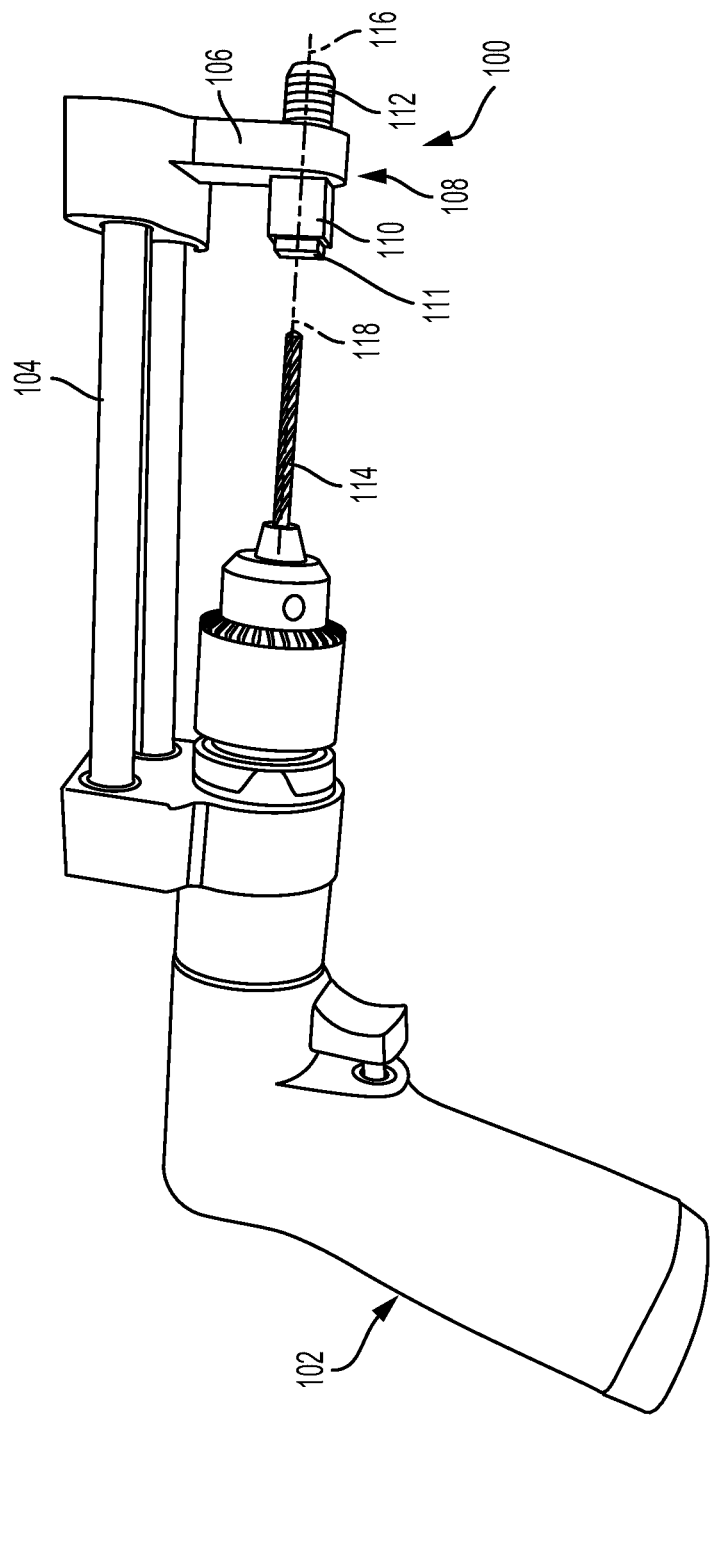
FIG. 2 is a side view of a drilling system including an alignment system, according to an example embodiment.
Figure 3:
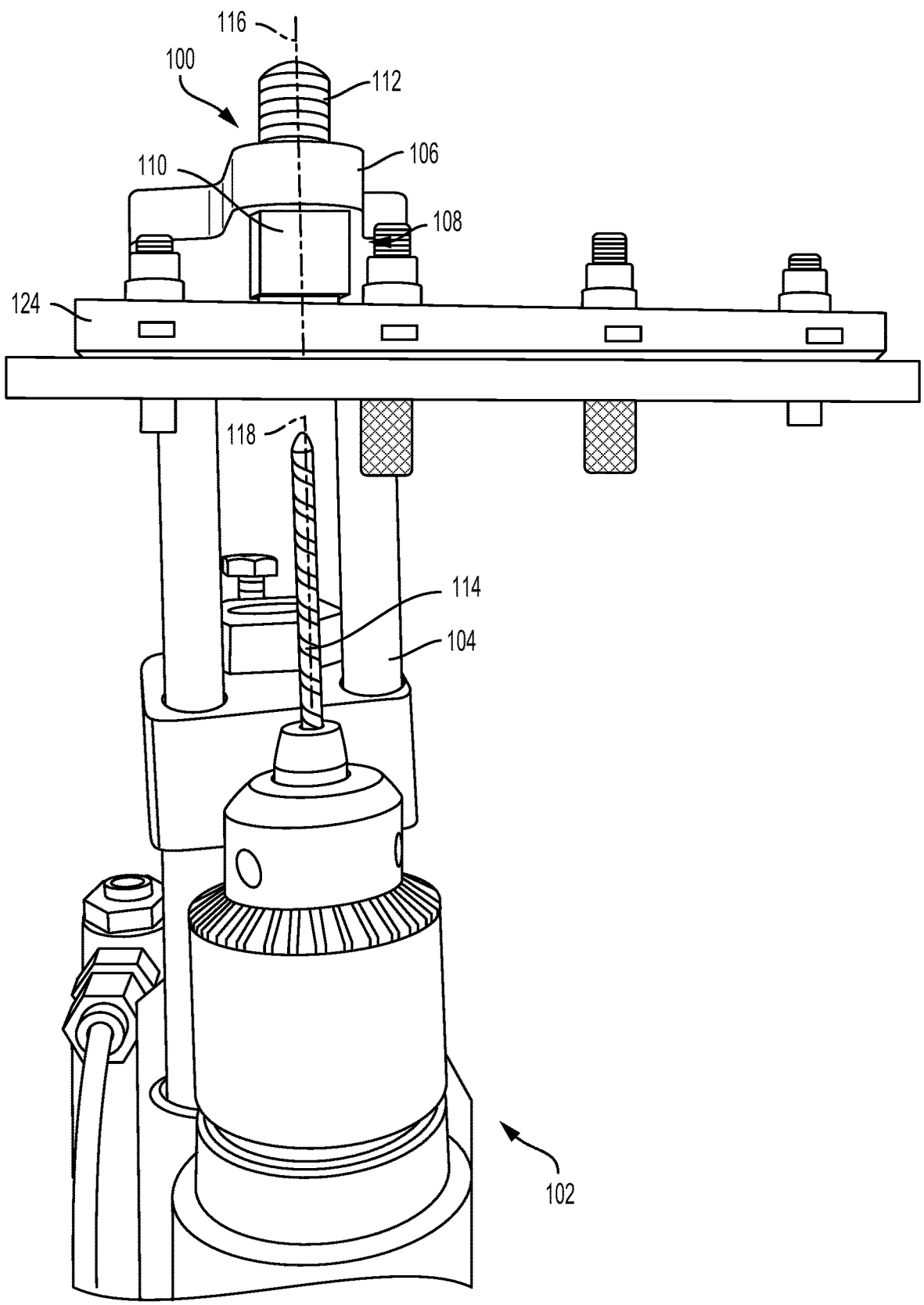
FIG. 3 is front view of the alignment system of FIG. 1.
Figure 4A:
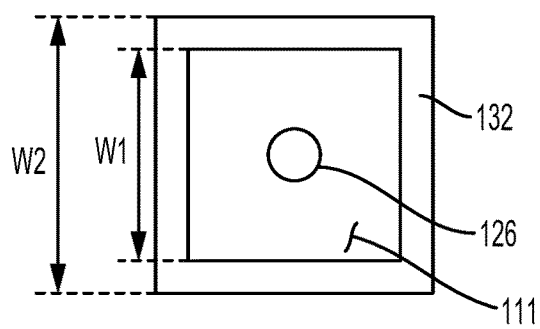
FIG. 4A is a bottom view of the drill block of the alignment system of FIG. 1.
Figure 4B:
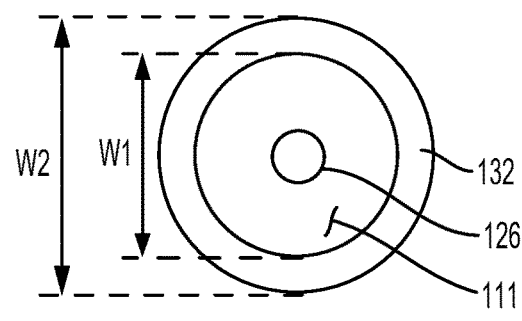
FIG. 4B is a bottom view of a drill block having a circular cross-section, according to an example embodiment.

FIG. 2 illustrates a perspective view of the drilling system 200 including the alignment system 100. As shown in FIG. 2, the drill 102 may include an arm assembly 104 with a foot 106 extending perpendicular to the arm assembly 104. The alignment system 100 may include a drill block 108 having a guide portion 110 and an attachment portion 112, as described above. The attachment portion 112 is configured to be removably coupled to the foot 106 such that the drill block 108 is positioned between the foot 106 and a drill bit 114 of the drill 102, as shown in FIG. 2. In one example, a cross-section of the guide portion 110 of the drill block 108 is square, or substantially square (e.g., with rounded edges), as shown in FIG. 4A. In another example, a cross-section of the guide portion 110 of the drill block 108 is circular, as shown in FIG. 4B. Such an arrangement may provide an advantage in that the guide portion 110 can be rotated to any angle and would still be able to fit at least partially within opposing legs of a gang channel. In yet another example, a cross-section of the guide portion 110 of the drill block 108 is elliptical. Other cross-sectional shapes of the guide portion 110 of the drill block 108 are possible as well. As shown in FIGS. 2 and 3, a longitudinal axis 116 of the drill block 108 is coaxial with a longitudinal axis 118 of the drill bit 114 when the attachment portion 112 of the drill block 108 is coupled to the foot 106 of the drill 102. Further, as shown in FIGS. 3 and 6A-7B, the guide portion 110 of the drill block 108 is configured to at least partially contact an inner surface 120 of opposing legs 122A, 122B of a gang channel 124 to thereby center the drill bit 114 between the opposing legs 122A, 122B of the gang channel 124.

As shown in FIGS. 4A-4B, the guide portion 110 of the drill block 108 may include a recess 126 configured to receive at least a portion of the drill bit 114. More specifically, the recess 126 is defined in an end surface 111 of the guide portion 110 of the drill block 108 and is sized to receive at least a portion of the drill bit 114 without the drill bit 114 enlarging the recess 126 during a drilling operation. As such, when in use an operator can drill through a workpiece and into the drill block 108 to ensure that the drill bit 114 goes entirely through the workpiece (e.g., in one side and out an opposite side). As shown in FIGS. 4A-4B, the guide portion 110 of the drill block 108 includes a first end 128 and a second end 130. In such an example, the second end 130 may be coupled to the attachment portion 112, and a width W2 of the second end 130 of the guide portion 110 is greater than a width W1 of the first end 128 of the guide portion 110. The width W2 of the second end 130 of the guide portion 110 may be greater than a distance between opposing legs 122A, 122B of a first gang channel (shown in FIGS. 6A-6B), but less than a distance between opposing legs 122A, 122B of a second gang channel (shown in FIGS. 7A-7B). The width W1 of the first end 128 of the guide portion 110 may be less than a distance between opposing legs 122A, 122B of the first gang channel. In one particular example, the first gang channel may be a ¼ inch (in.) (6.35 millimeters) gang channel and the second gang channel may be a 3/16 in. (4.7625 millimeters) gang channel. In such an example, the width W2 of the second end 130 of the guide portion 110 may be about 0.4 in. (10.16 millimeters), and the width W1 of the first end 128 of the guide portion 110 may be about 0.35 in. (8.89 millimeters). Other widths W1, W2 are possible as well.

Figure 6A:
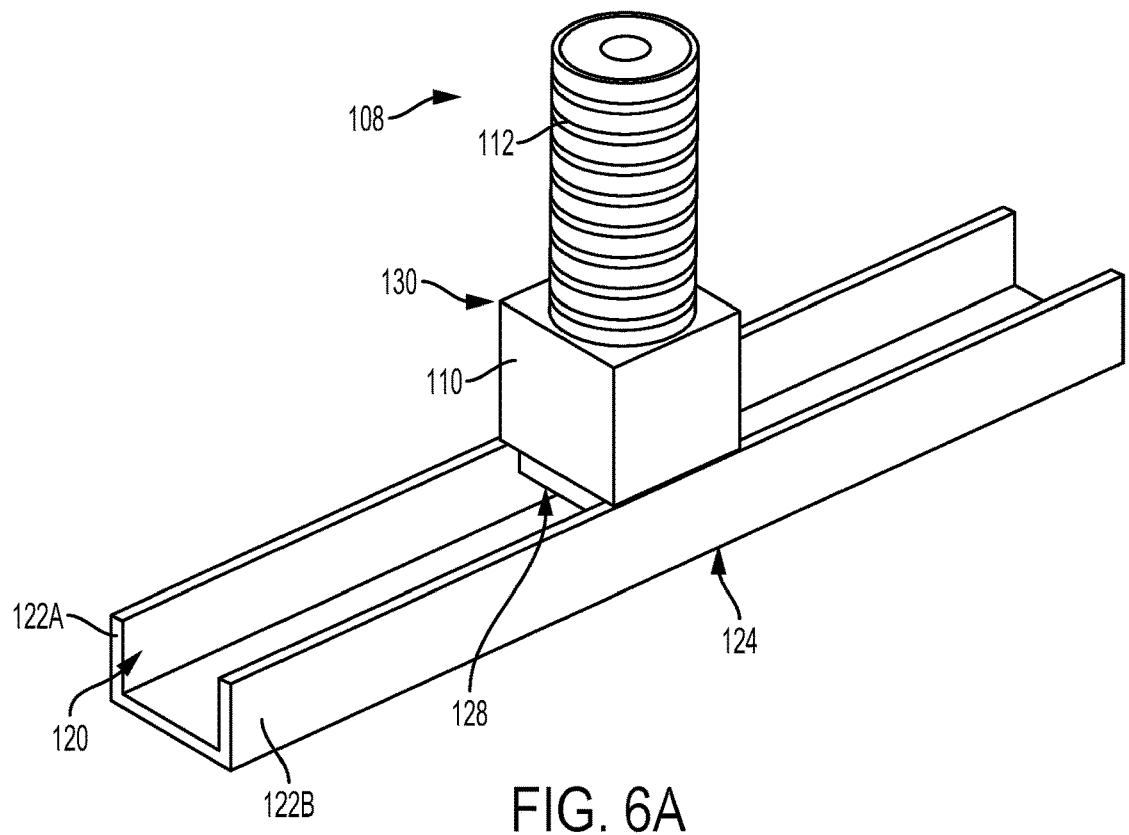
FIG. 6A is a perspective view of the drill block positioned in a gang channel, according to an example embodiment.

Such an arrangement enables a single drill block 108 to fit within two different sized gang channels, as illustrated in FIGS. 6A-7B. As shown in FIGS. 6A-6B, the guide portion 110 of the drill block 108 is positioned at least partially within a gang channel 124 having a first width. In such an example, the first end 128 of the guide portion 110 is positioned between the opposing legs 122A, 122B of the gang channel 124, while the second end 130 of the guide portion 110 is positioned outside of the gang channel 124. In such an example, the lip 132 separating the part of the guide portion 110 having the first width W1 and the part of the guide portion 110 having the second width W2 contacts a top surface 134 of the gang channel 124. As used herein, the top surface 134 may be considered a part of the inner surface 120. As such, when the lip 132 contacts the top surface 134, the guide portion 110 at least partially contacts the inner surface 120 of opposing legs 122A, 122B of the gang channel 124. In one particular example, the gang channel shown in FIGS. 6A-6B is a ¼ in. gang channel.

Figure 6B:
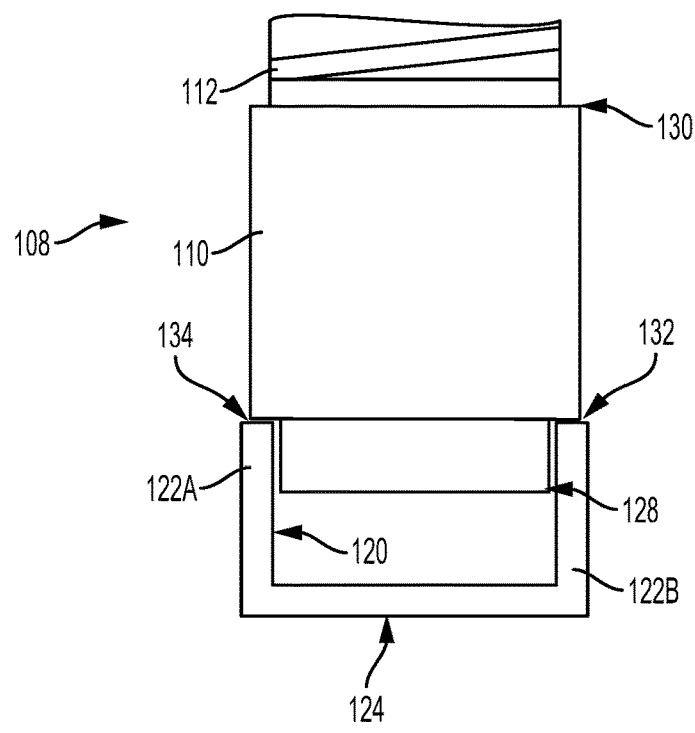
FIG. 6B is a side view of the drill block positioned in the gang channel of FIG. 6A.
Figure 7A:
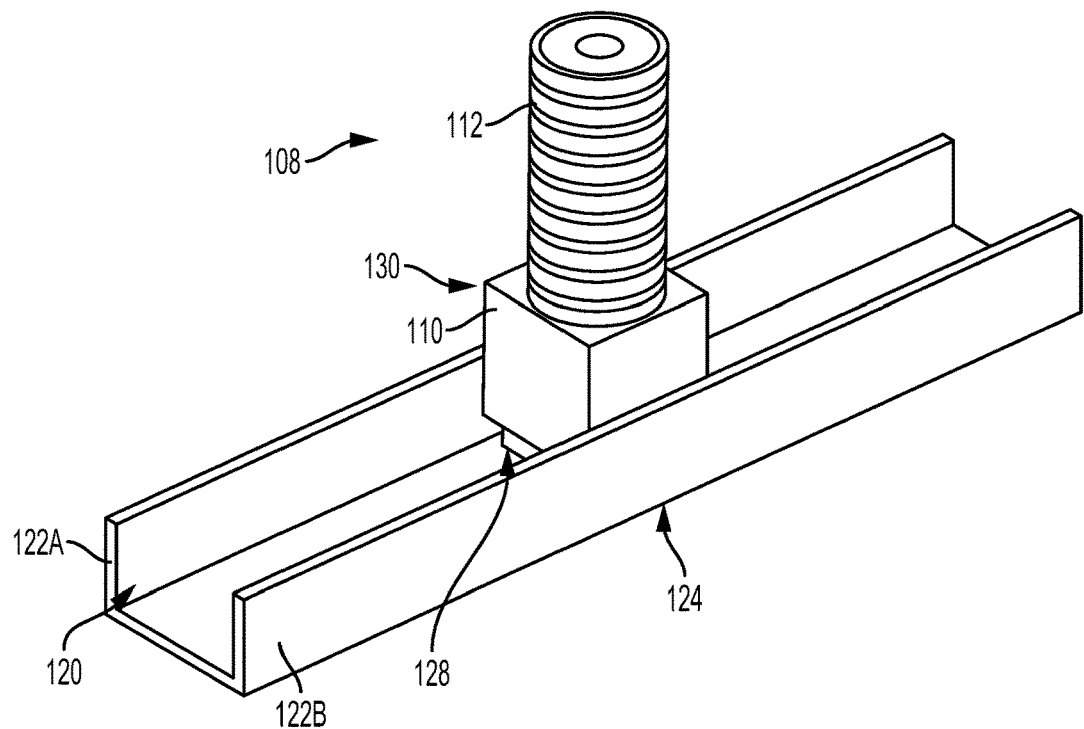
FIG. 7A is a perspective view of the drill block positioned in a gang channel, according to an example embodiment.
Figure 7B:
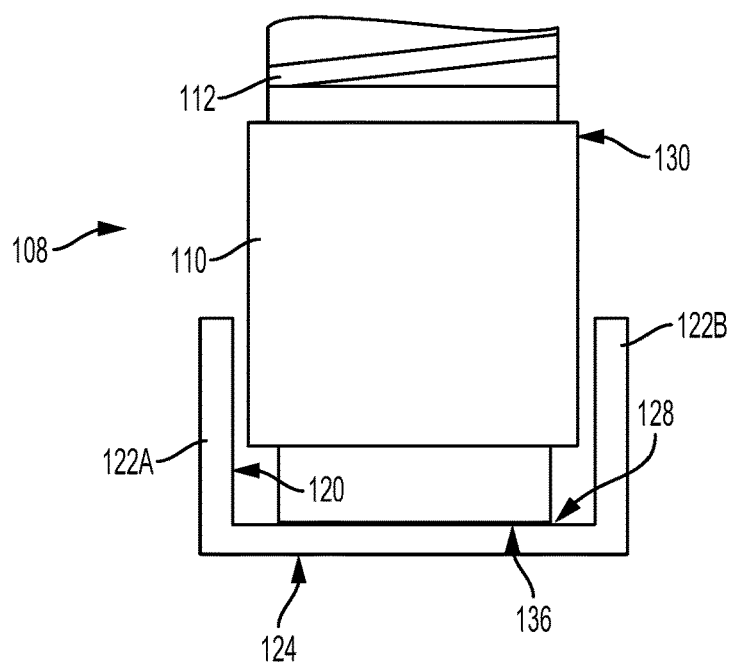
FIG. 7B is a side view of the drill block positioned in the gang channel of FIG. 7A.

As shown in FIGS. 7A-7B, the guide portion 110 of the drill block 108 is positioned at least partially within a gang channel 124 having a second width that is greater than the first width of the gang channel is FIGS. 6A-6B. In such an example, the first end 128 of the guide portion 110 is positioned at a bottom surface 136 of the gang channel, and the part of the guide portion 110 having the second width W2 is positioned between the opposing legs 122A, 122B of the gang channel 124, while the second end 130 of the guide portion 110 is positioned outside of the gang channel 124. As used herein, the bottom surface 136 may be considered a part of the inner surface 120. As such, when the second end 130 of the guide portion 110 of the drill block 108 contacts the bottom surface 136, the guide portion 110 at least partially contacts the inner surface 120 of opposing legs 122A, 122B of the gang channel 124. In one particular example, the gang channel shown in FIGS. 7A-7B is a 3/16 in. gang channel.

Figure 5:
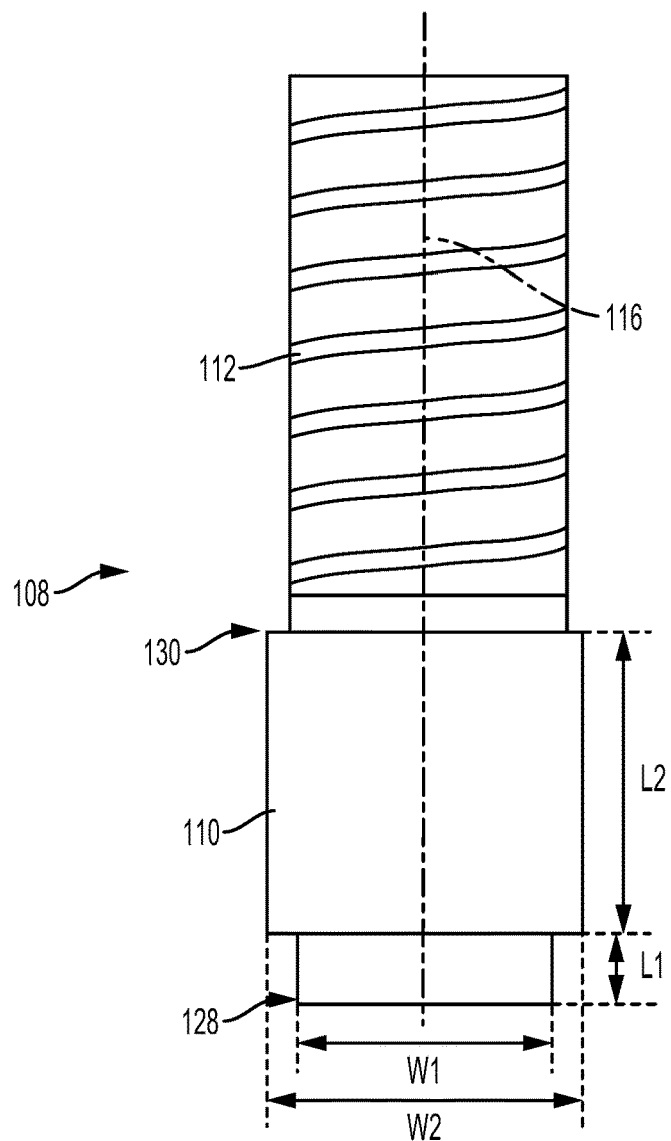
FIG. 5 is a side view of the drill block of the alignment system of FIG. 1.

Further, as shown in FIG. 5, a length L2 of the second end 130 of the guide portion 110 may be greater than a length L1 of the first end 128 of the guide portion 110. In one particular example, a ratio of the length L2 of the second end 130 of the guide portion 110 to the length L1 of the first end 128 of the guide portion 110 is between about 2:1 and about 5:1. In one particular example, the length L1 of the first end 128 of the guide portion 110 is about 0.1 in. (2.54 millimeters), and the length L2 of the second end 130 of the guide portion 110 is about 0.4 in. (10.16 millimeters). As described above, the attachment portion 112 is configured to be removably coupled to the foot 106 such that the drill block 108 is positioned between the foot 106 and a drill bit 114 of the drill 102. In one example, as shown in FIG. 5, the attachment portion 112 of the drill block 108 is threaded, and the drill block 108 is removably coupled to the foot 106 of the arm assembly 104 via complementary threads in the foot 106. In another example, the attachment portion 112 of the drill block 108 includes a post that is removably coupled to the foot 106 of the arm assembly 104 via a set screw in the foot 106. Other attachment mechanisms between the drill block 108 and the foot 106 of the drill 102 are possible as well.

Figure 8:
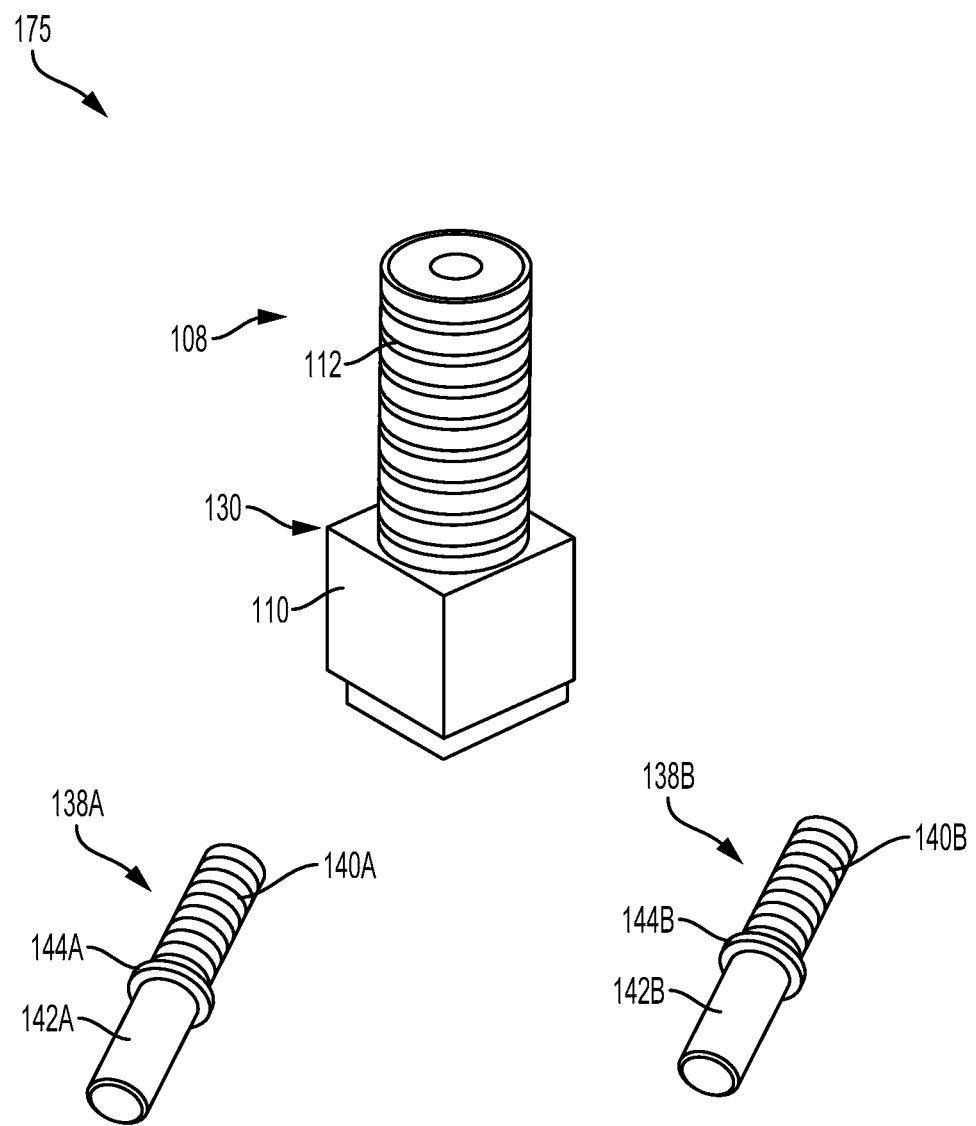
FIG. 8 is a perspective view of a kit including a drill block, a first alignment pin, and a second alignment pin, according to an example embodiment.
Figure 9:
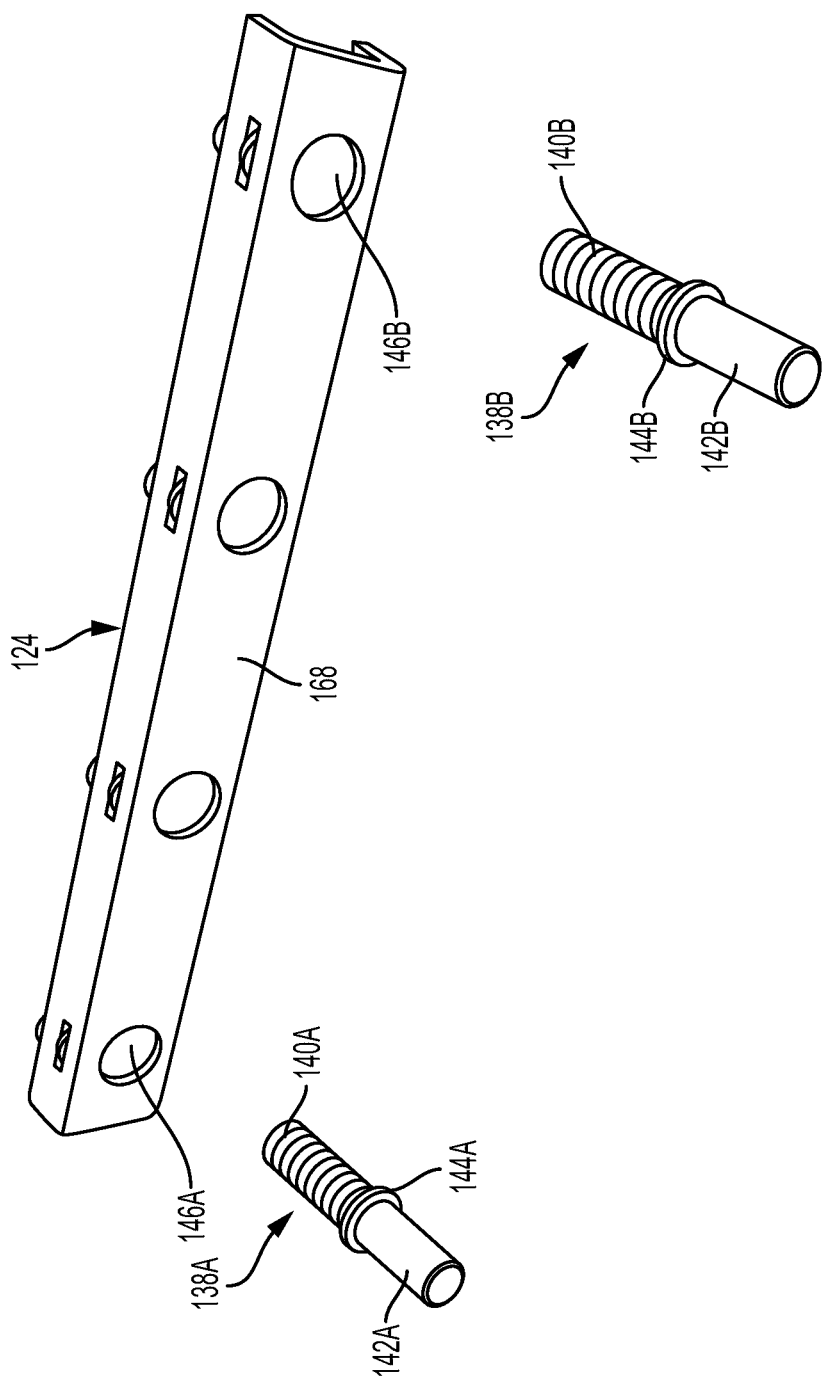
FIG. 9 is a perspective view of a first alignment pin, a second alignment pin, and a gang channel, according to an example embodiment.

FIG. 8 illustrates a kit 175 including the drill block 108, a first alignment pin 138A, and a second alignment pin 138B. In one example, the first alignment pin 138A and the second alignment pin 138B may be components of the alignment system 100. The first alignment pin 138A may include a first end 140A and a second end 142A. The first alignment pin 138A may further include a first flange 144A positioned between the first end 140A and the second end 142A. The first flange 144A has a greater width than a width of the first end 140A and a width of the second end 142A. The first end 140A may be threaded such that the first alignment pin 138A is configured to be removably coupled to a first complementary threaded hole 146A in the gang channel 124, as shown in FIG. 9. The second alignment pin 138B may include a first end 140B and a second end 142B. The second alignment pin 138B may include a second flange 144B positioned between the first end 140B and the second end 142B. The second flange 144B has a greater width than a width of the first end 140B and a width of the second end 142B. The first end 140B may be threaded such that the second alignment pin 138B is configured to be removably coupled to a second complementary threaded hole 146B in the gang channel 124, as shown in FIG. 9. In one example, the second end 142A, 142B of each of the first alignment pin 138A and the second alignment pin 138B is threaded to removably couple the gang channel 124 to a workpiece (such as workpiece 162 shown in FIG. 11C).

As described in additional detail below, the first end 140A, 140B of each of the first alignment pin 138A and the second alignment pin 138B is threaded to removably couple the alignment pins 138A, 138B to the gang channel 124. The second end 142A, 142B of each of the first alignment pin 138A and the second alignment pin 138B is then passed through existing holes in the workpiece. Such an arrangement prevents the gang channel 124 from floating with respect to the workpiece, and further aligns the gang channel 124 with respect to the existing holes in the workpiece. This ensures that when the drill block 108 is positioned between the opposing legs 122A, 122B of the gang channel 124, the drill bit 114 will be centered with respect to the opposing legs 122A, 122B of the gang channel 124.

The drill block 108 and the alignment pins 138A, 138B may include any suitable material, including plastics, metals, and composites as non-limiting examples. In one particular example, each of the guide portion 110 of the drill block 108 and the attachment portion 112 of the drill block 108 include or are formed of the same material.

In another example, the guide portion 110 of the drill block 108 includes a first material, and the attachment portion 112 of the drill block 108 include a second material that is different than the first material. In one embodiment of such an example, the first material includes or is a plastic, and the second material includes or is a metal. Such an example may provide increases strength in the attachment portion 112 to prevent the drill block 108 from breaking off from the foot 106 of the drill 102 when in use. In another embodiment, the first material includes a metal, and the second material includes a plastic.

In certain embodiments, such as shown in any one of FIGS. 1-9, example systems 100, 200 or components thereof are made using an additive-manufacturing machine, such as stereolithography, multi jet modeling, inkjet printing, selective laser sintering/melting, and fused filament fabrication, among other possibilities. An example additive-manufacturing machine creates the alignment system 100 described in any one of FIGS. 1-9 using a single material. Such a material includes stainless steel, titanium, nickel super-alloy, aluminum, polymer composites (e.g., carbon fiber reinforced nylon) and polymer nanocomposites (e.g., carbon nanotube filled nylon), polyether ether ketone (PEEK), polyethylene (PE), or polypropylene (PP), as examples. In another example, the additive-manufacturing process is a multi-material additive-manufacturing process such that various components of the alignment system 100 are formed using a material with a material property than the other components. In such an example, as discussed above, the guide portion 110 of the drill block 108 includes a first material, and the attachment portion 112 of the drill block 108 include a second material that is different than the first material.

Figure 10:
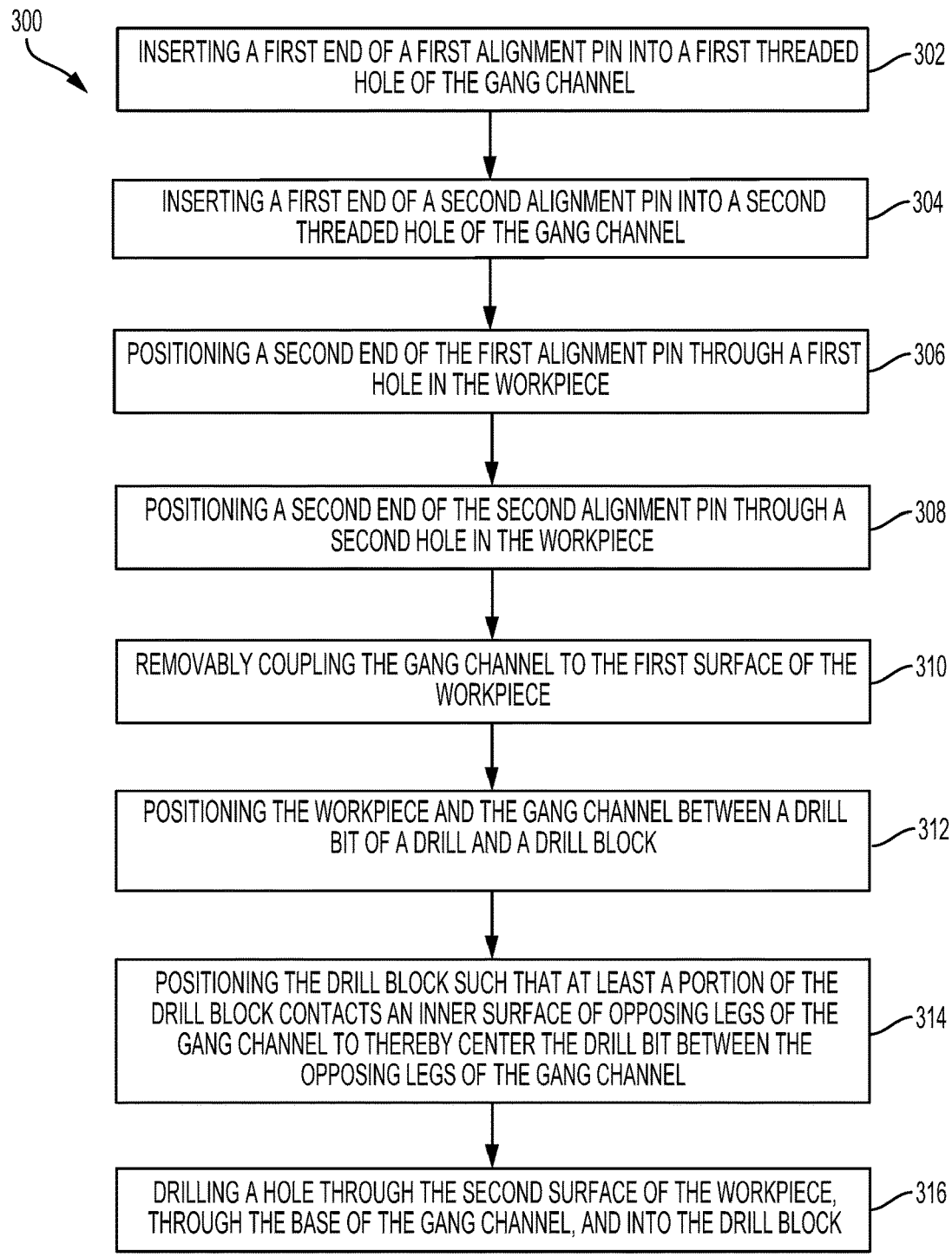
FIG. 10 is a flowchart of an example method of drilling a hole through a gang channel and a workpiece, according to an example embodiment.

FIG. 10 is a block diagram of an example method for drilling a hole 173 through a gang channel 124 and a workpiece 162. The workpiece 162 includes a first surface 164 and a second surface 166 with holes 170 through the surfaces 164, 166. As described above, the gang channel 124 includes opposing legs 122A, 122B extending from a base 168. The first surface 164 may be a visible surface with respect to the operator, and the second surface 166 may be a non-visible surface with respect to the operator. Method 300 includes one or more operations, functions, or actions as illustrated by one or more of blocks 302-316. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Figure 11A:
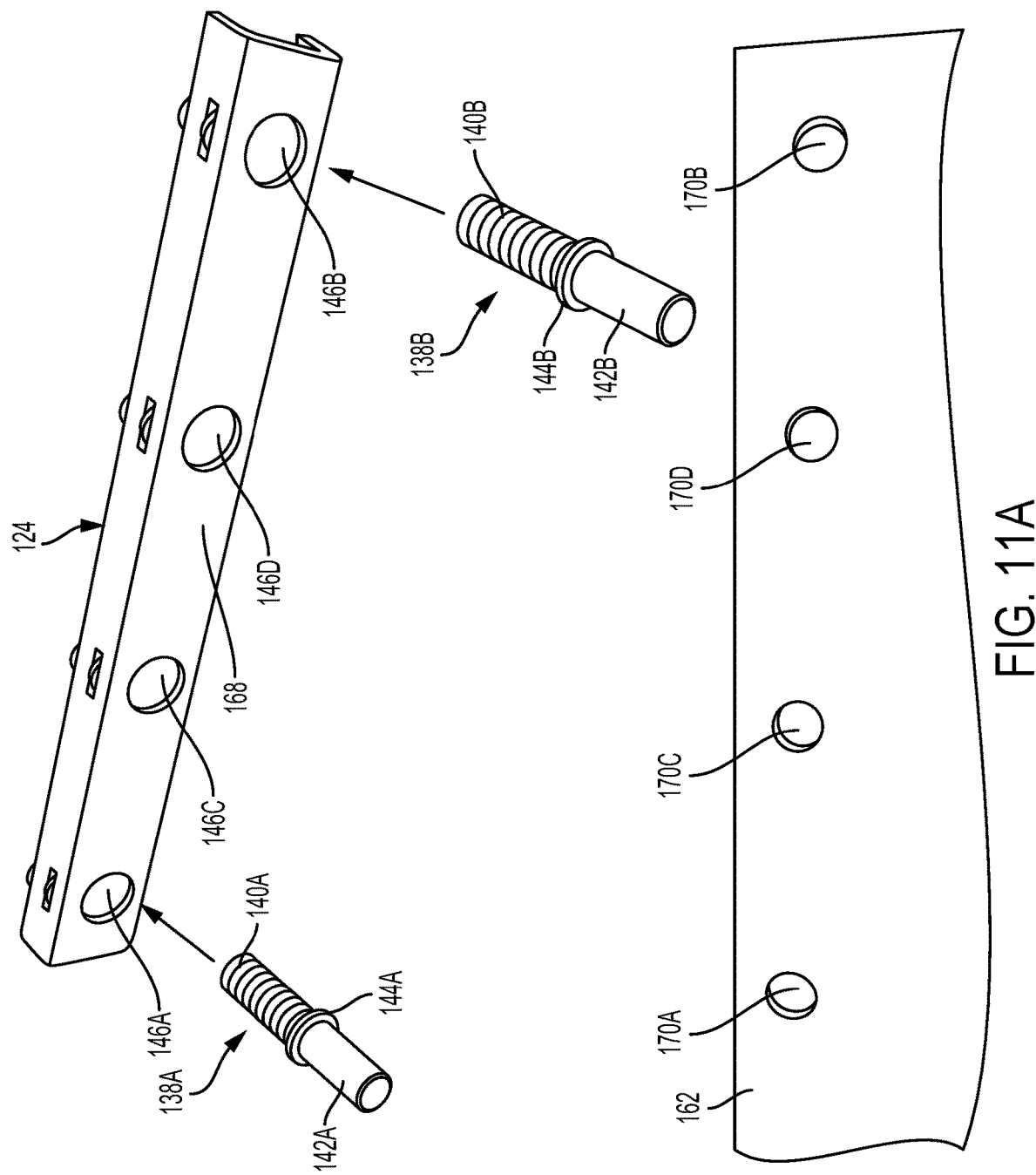
Figure 11B:
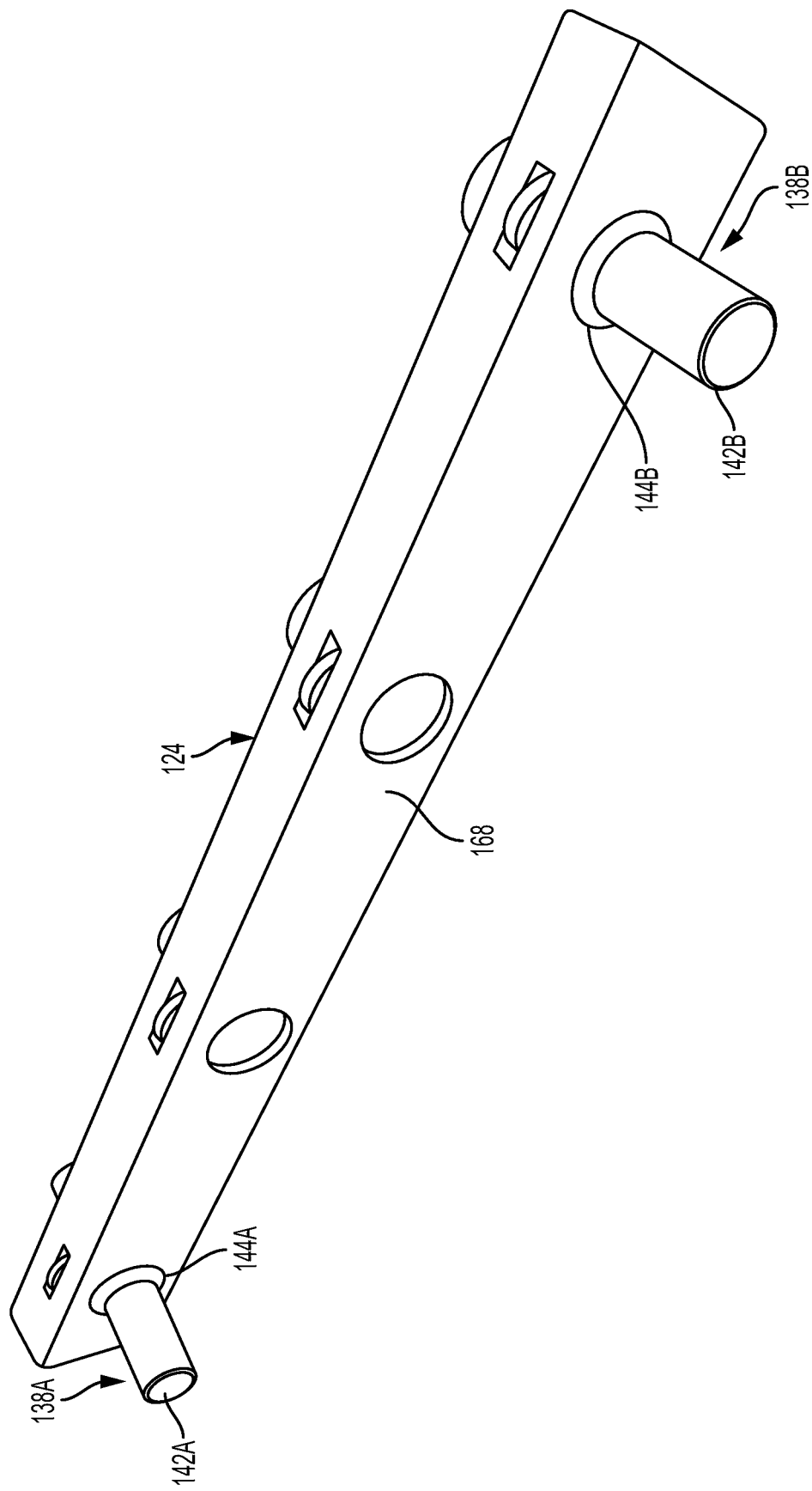

Initially, at block 302, the method 300 includes inserting a first end 140A of a first alignment pin 138A into a first threaded hole 146A of the gang channel 124. At block 304, the method 300 includes inserting a first end 140B of a second alignment pin 138B into a second threaded hole 146B of the gang channel 124. As shown in FIG. 11A, the gang channel 124 may include a plurality of threaded holes 146 including the first threaded hole 146A and the second threaded hole 146B. At block 306, the method 300 includes positioning a second end 142A of the first alignment pin 138A through a first hole 170A in the workpiece 162. At block 308, the method 300 includes positioning a second end 142B of the second alignment pin 138B through a second hole 170B in the workpiece 162. As shown in FIG. 11A, the workpiece 162 may include a plurality of pre-drilled holes 170 including the first hole 170A and the second hole 170B.

Figure 11C:
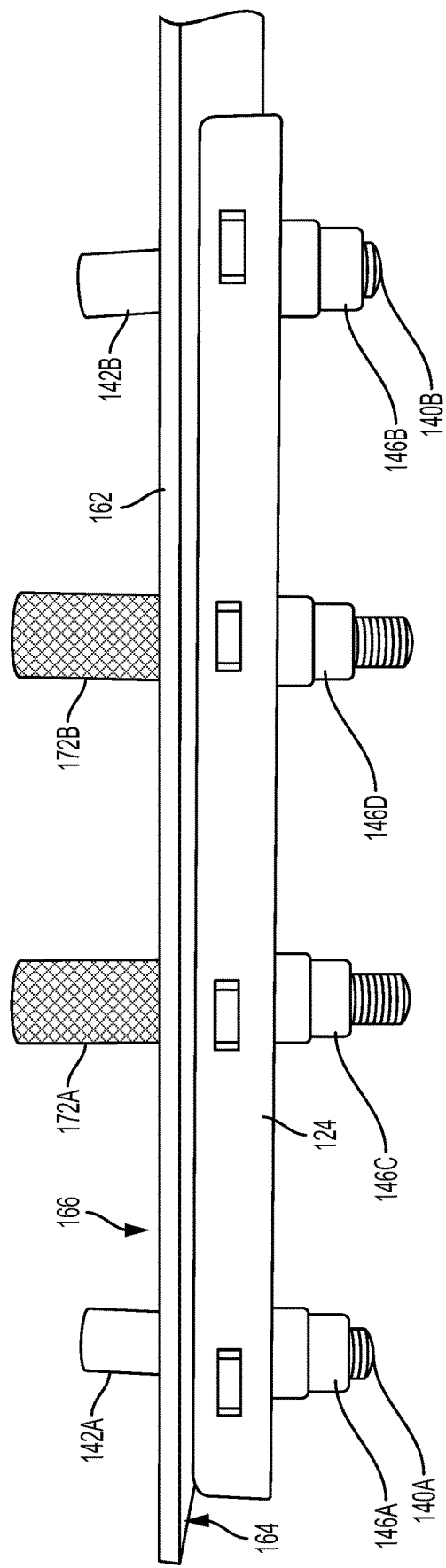

At block 310, the method 300 includes removably coupling the gang channel 124 to the first surface 164 of the workpiece 162. Removably coupling the gang channel 124 to the first surface 164 of the workpiece 162 may take a variety of forms. In one example, as shown in FIG. 11C, removably coupling the gang channel 124 to the first surface 164 of the workpiece 162 includes inserting a threaded post 172A through a third hole 170C in the workpiece 162 and into a third threaded hole 146C of the gang channel 124. The method 300, at block 310, may further include inserting a second threaded post 172B through a fourth hole 170D in the workpiece 162 and into a fourth threaded hole 146D of the gang channel 124. Such an arrangement is shown in FIG. 11C. As shown in FIG. 11C, the plurality of threaded holes 146 are defined by a structure that extends away from the gang channel 124. The interior surface of such a structure is threaded to receive the alignment pins 138A, 138B and threaded posts 172A, 172B as discussed above. In another example, the second end 142A of the first alignment pin 138A and the second end 142B of the second alignment pin 138B are both threaded. In such an example, removably coupling the gang channel 124 to the first surface 164 of the workpiece 162 may include tightening a first nut on the second end 142A of the first alignment pin 138A, and tightening a second nut on the second end 142B of the second alignment pin 138B.

At block 312, the method 300 includes positioning the workpiece 162 and the gang channel 124 between a drill bit 114 of a drill 102 and a drill block 108. As discussed above in relation to FIGS. 1-9, the drill 102 includes an arm assembly 104 with a foot 106 extending perpendicular to the arm assembly 104. The drill block 108 is removably coupled to the foot 106 such that the drill block 108 is positioned between the foot 106 and the drill bit 114. A longitudinal axis 116 of the drill block 108 is coaxial with a longitudinal axis 118 of the drill bit 114 when drill block 108 is coupled to the foot 106 of the drill 102.

Figure 11E:
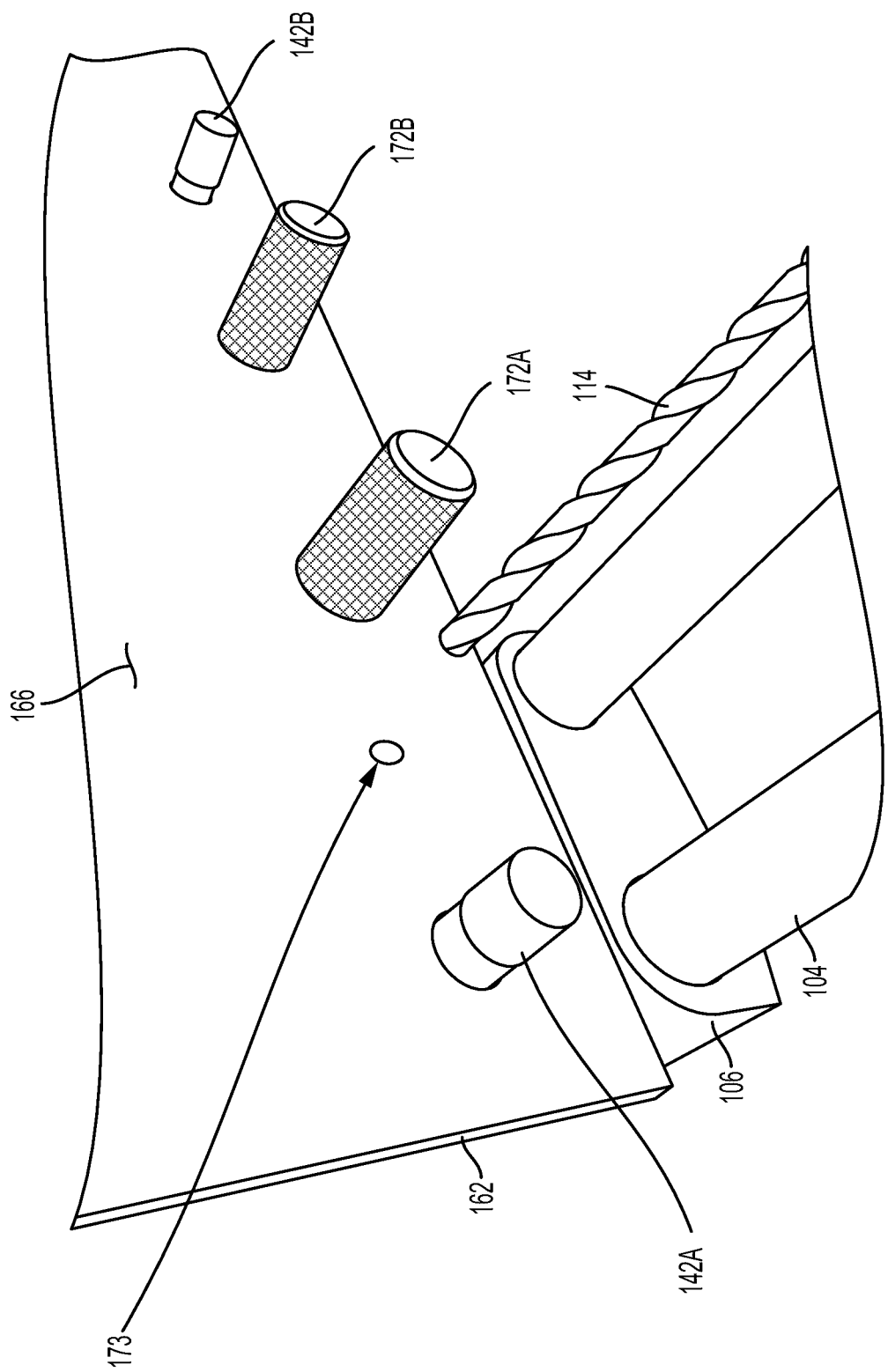
Figure 11F:
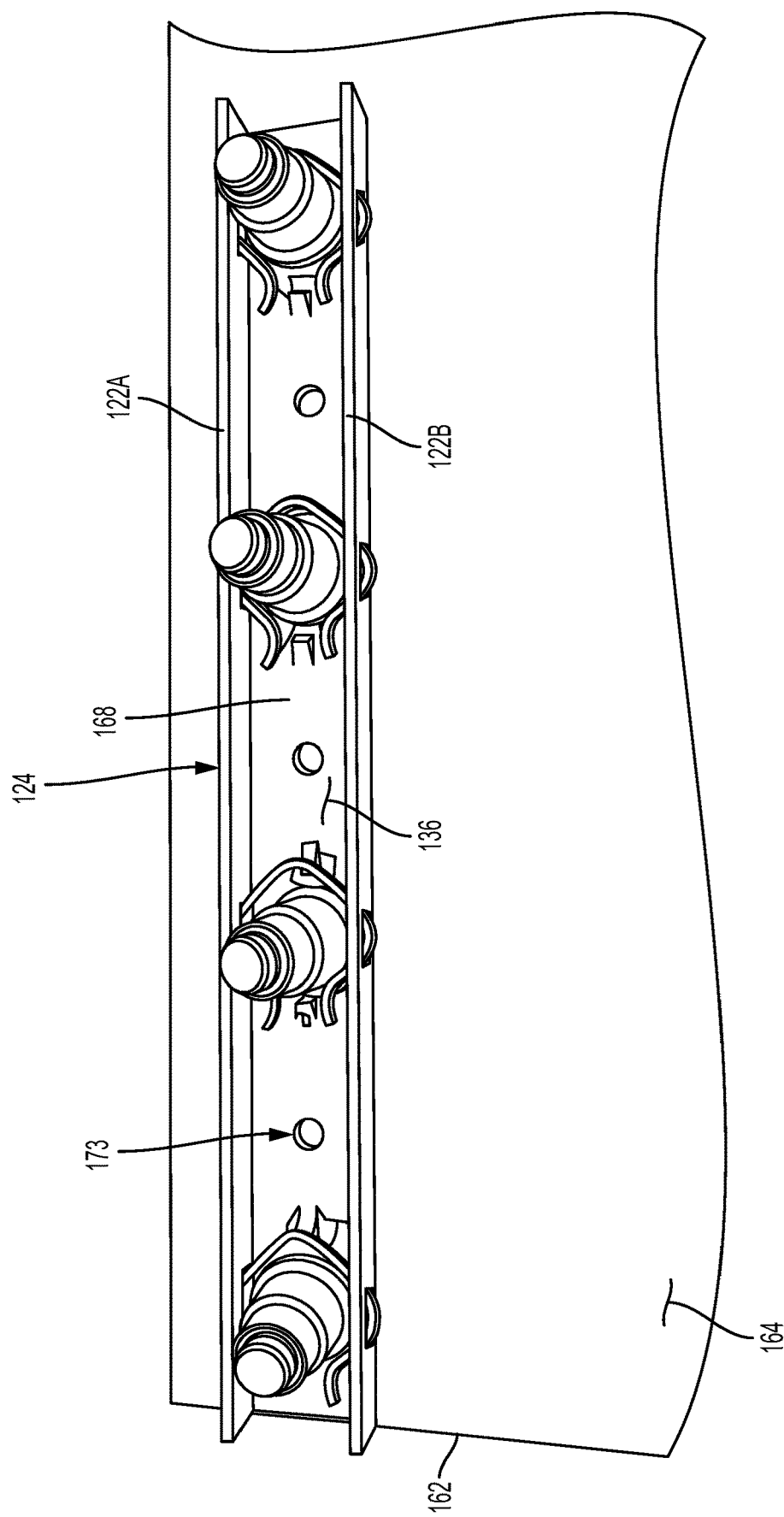

At block 314, the method 300 includes positioning the drill block 108 such that at least a portion of the drill block 108 contacts an inner surface 120 of opposing legs 122A, 122B of the gang channel 124 to thereby center the drill bit 114 between the opposing legs 122A, 122B of the gang channel 124. Such an arrangement is shown in FIG. 11D. At block 316, the method 300 includes drilling a hole 173 through the second surface 166 of the workpiece 162, through the base 168 of the gang channel 124, and into the drill block 108. Such an arrangement is shown in FIG. 11E. Example holes drilled through the second surface 166 of the workpiece 162 and through the base 168 of the gang channel 124 are shown in FIG. 11F.

In one example, the gang channel 124 includes a plurality of threaded holes including the first threaded hole 146A and the second threaded hole 146B. In such an example, the method 300 may further include centering the drill block 108 between adjacent threaded holes of the plurality of threaded holes prior to drilling the hole 173 through the second surface 166 of the workpiece 162, through the gang channel 124, and into the drill block 108. In another example, the method 300 may further include (i) positioning the drill block 108 such that the drill block 108 contacts the inner surface 120 of opposing legs 122A, 122B of the gang channel 124 between each of the plurality of threaded holes of the gang channel 124, and (ii) drilling a hole 173 through the second surface 166 of the workpiece 162, through the base 168 of the gang channel 124, and into the drill block 108 such that there is a hole in the base 168 of the gang channel 124 between each of the plurality of threaded holes of the gang channel 124.

In another example, the method 300 further includes (i) decoupling the gang channel 124 from the first surface 164 of the workpiece 162, (ii) removing the first alignment pin 138A from the first hole 170A in the workpiece 162, (iii) removing the second alignment pin 138B from the second hole 170B in the workpiece 162, (iv) removing the first alignment pin 138A from the first threaded hole 146A in the gang channel 124, (v) removing the second alignment pin 138B from the second threaded 146B hole in the gang channel 124, and/or (vi) positioning a fastener in the hole through the workpiece 162 and the base 168 of the gang channel 124 to permanently fasten the gang channel 124 to the first surface 164 of the workpiece 162. Such a fastener may be a rivet, or any other fastener to permanently attach the gang channel 124 to the first surface 164 of the workpiece 162.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts have been described in conjunction with specific examples, it will be understood that these examples are not intended to be limiting.

In FIG. 10, referred to above, the blocks may represent operations and/or portions thereof and lines connecting the various blocks do not imply any particular order or dependency of the operations or portions thereof. It will be understood that not all dependencies among the various disclosed operations are necessarily represented. FIG. 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

As used herein, "coupled" means associated directly as well as indirectly. For example, a member A may be directly associated with a member B, or may be indirectly associated therewith, e.g., via another member C. It will be understood that not all relationships among the various disclosed elements are necessarily represented.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An alignment system, comprising:
   a coupler, configured to be attached to a drill;
   an arm assembly having a first end and a second end, wherein the first end is attached to the coupler;
   a foot, attached to the second end of the arm assembly and extending perpendicular to the arm assembly;
   a first gang channel, comprising:
      a first elongated base, comprising a first surface, configured to contact a workpiece positioned between a drill bit of the drill and the first gang channel, and a second surface facing away from the first surface;
      a first pair of parallel legs, extending from the first elongated base in a first direction, perpendicular to each of the first surface and the second surface, the first pair of parallel legs defining a first channel therebetween; and
      a first plurality of threaded receptacles, configured to be removably coupled to the first gang channel;
   a second gang channel comprising:
      a second elongated base, comprising a third surface, configured to contact the workpiece positioned between the drill bit of the drill and the second gang channel, and a fourth surface facing away from the third surface;
      a second pair of parallel legs, extending from the second elongated base in a second direction, perpendicular to each of the third surface and the fourth surface, the second pair of parallel legs defining a second channel therebetween; and
      a second plurality of threaded receptacles, configured to be removably coupled to the second gang channel;
   a plurality of alignment pins, comprising a first alignment pin, configured to be coupled to the first gang channel, and a second alignment pin, configured to be coupled to the second gang channel,
   wherein:
      the plurality of alignment pins is configured for insertion into a plurality of pre-drilled holes in the workpiece so as to locate, via the first alignment pin, the first gang channel relative to the workpiece during a drilling operation, or to locate, via the second alignment pin, the second gang channel relative to the workpiece during the drilling operation, and
      each of the plurality of alignment pins comprises a threaded end that is configured to be threaded into one of the first plurality of threaded receptacles of the first gang channel or one of the second plurality of threaded receptacles of the second gang channel; and
   a drill block, comprising a guide portion and an attachment portion,
   wherein:
      the attachment portion is coupled directly to the foot,
      the guide portion of the drill block has a first end portion and a second end portion,
      the first end portion of the guide portion extends from the second end portion of the guide portion,
      the second end portion of the guide portion is coupled to the attachment portion,
      the first end portion of the guide portion has a first-end-portion width and a first-end-portion length,
      the second end portion of the guide portion has a second-end-portion width and a second-end-portion length,
      the second-end-portion width is greater than the first-end-portion width,
      the second-end-portion length is greater than the first-end-portion length,
      the first end portion of the guide portion and the second end portion of the guide portion both have a square cross-sectional shape,
      the guide portion extends away from the foot in a direction toward the coupler,
      the first end portion of the guide portion of the drill block comprises a planar end surface,
      the drill block has only a single recess,
      the single recess is defined in the planar end surface of the drill block and is coaxial with the attachment portion of the drill block,
      the first end portion of the guide portion of the drill block is configured to be received between the first pair of parallel legs of the first gang channel when the second end portion of the guide portion is placed in contact with an end surface of each leg of the first pair of parallel legs of the first gang channel,
      when the first end portion of the guide portion of the drill block is received between the first pair of parallel legs of the first gang channel, rotation of the guide portion of the drill block relative to the first gang channel is limited by the first pair of parallel legs,
      a part of the second end portion of the guide portion is configured to be received between the second pair of parallel legs of the second gang channel when the first end portion of the guide portion of the drill block is received between the second pair of parallel legs of the second gang channel and abuts the fourth surface of the second gang channel,
      when at least the part of the second end portion of the guide portion is received between the second pair of parallel legs of the second gang channel, rotation of the guide portion of the drill block relative to the second gang channel is limited by the second pair of parallel legs,
      the foot comprises a first portion, having a first-portion-width, and a second portion having a second-portion-width that is less than the first-portion-width,
      the first portion of the foot has a first-portion surface that faces the coupler configured to be attached to the drill,
      the arm assembly is attached to the first portion of the foot, the second portion of the foot extends from the first portion of the foot toward a longitudinal axis of the drill block and is perpendicular to the arm assembly, the second portion of the foot comprises a second-portion surface that faces the coupler configured to be attached to the drill, the first-portion surface and the second-portion surface are substantially parallel to each other, the first portion of the foot and the second portion of the foot each have a length measured in a direction parallel to the longitudinal axis of the drill block, the length of the first portion of the foot is greater than the length of the second portion of the foot, the second-portion surface is located farther away from the coupler than the first-portion surface, the attachment portion has a length measured in the direction parallel to the longitudinal axis of the drill block, the length of the attachment portion is greater than the length of the second portion of the foot, the attachment portion protrudes from the foot in the direction parallel to the longitudinal axis of the drill block, the second portion of the foot extends from the first portion of the foot such that two concave corners are formed in a surface of the foot that is parallel to the longitudinal axis of the drill block, the attachment portion of the drill block is removably coupled directly to the second portion of the foot, and the arm assembly comprises a first tubular structure and a second tubular structure, separated from each other by a gap, the guide portion of the drill block lies in a virtual plane that passes between the first tubular structure and the second tubular structure, without intersecting the first tubular structure and the second tubular structure.

2. The alignment system of claim 1, wherein a ratio of the second-end-portion length of the second end portion of the guide portion to the first-end-portion length of the first end portion of the guide portion is between 2:1 and 5:1.

3. The alignment system of claim 1, wherein the attachment portion of the drill block is threaded, and wherein the drill block is removably coupled to the foot of the arm assembly via complementary threads in the foot.

4. The alignment system of claim 1, wherein the attachment portion of the drill block comprises a post that is removably coupled to the foot via a set screw in the foot.

5. The alignment system of claim 1, wherein:
the first alignment pin has a first end and a second end,
the first alignment pin comprises a first flange, positioned between the first end of the first alignment pin and the second end of the first alignment pin,
the first flange has a width, the first end of the first alignment pin has a width, and the second end of the first alignment pin has a width,
the width of the first flange is greater than either one of the width of the first end of the first alignment pin and the width of the second end of the first alignment pin,
the second alignment pin has a first end and a second end,
the second alignment pin comprises a second flange, positioned between the first end of the second alignment pin and the second end of the second alignment pin, the second flange has a width, the first end of the second alignment pin has a width, and the second end of the second alignment pin has a width, and the width of the second flange is greater than either one of the width of the first end of the second alignment pin and the width of the second end of the second alignment pin.

6. The alignment system of claim 1, wherein the guide portion and the attachment portion comprise materials, identical to each other.

7. The alignment system of claim 1, wherein the guide portion comprises a first material, and the attachment portion comprises a second material that is different than the first material.

8. The alignment system of claim 7, wherein:
the first material comprises plastic, and
the second material comprises metal.

9. The alignment system of claim 1, wherein:
the first-end-portion width is about 0.35 inches, and
the second-end-portion width is about 0.4 inches.

10. The alignment system of claim 1, wherein:
the first-end-portion length is about 0.1 inches, and
the second-end-portion length is about 0.4 inches.

11. The alignment system of claim 1, wherein:
the second end portion of the guide portion of the drill block comprises a second-end-portion planar surface, and
the second-end-portion planar surface contacts a planar surface of the foot when the attachment portion of the drill block is removably coupled to the foot.

12. A drilling system, comprising:
a drill;
a coupler, configured to be attached to a drill an arm assembly having a first end and a second end, wherein the first end is attached to the coupler;
a foot, attached to the second end of the arm assembly and extending perpendicular to the arm assembly;
a first gang channel, comprising:
a first elongated base, comprising a first surface, configured to contact a workpiece positioned between a drill bit of the drill and the first gang channel, and a second surface facing away from the first surface;
a first pair of parallel legs, extending from the first elongated base in a first direction, perpendicular to each of the first surface and the second surface, the first pair of parallel legs defining a first channel therebetween; and
a first plurality of threaded receptacles, configured to be removably coupled to the first gang channel;
a second gang channel comprising:
a second elongated base, comprising a third surface, configured to contact the workpiece positioned between the drill bit of the drill and the second gang channel, and a fourth surface facing away from the third surface;
a second pair of parallel legs, extending from the second elongated base in a second direction, perpendicular to each of the third surface and the fourth surface, the second pair of parallel legs defining a second channel therebetween; and
a second plurality of threaded receptacles, configured to be removably coupled to the second gang channel;
a plurality of alignment pins, comprising a first alignment pin, configured to be coupled to the first gang channel, and a second alignment pin, configured to be coupled to and the second gang channel,
wherein:

the plurality of alignment pins is configured for insertion into a plurality of pre-drilled holes in the workpiece so as to locate, via the first alignment pin, the first gang channel relative to the workpiece during a drilling operation, or to locate, via the second alignment pin, the second gang channel relative to the workpiece during the drilling operation, and each of the plurality of alignment pins comprises a threaded end that is configured to be threaded into one of the first plurality of threaded receptacles of the first gang channel or one of the second plurality of threaded receptacles of the second gang channel; and a drill block, comprising a guide portion and an attachment portion, wherein:
the attachment portion is coupled directly to the foot,
the guide portion of the drill block has a first end portion and a second end portion,
the first end portion of the guide portion extends from the second end portion of the guide portion,
the second end portion of the guide portion is coupled to the attachment portion,
the first end portion of the guide portion has a first-end-portion width and a first-end-portion length,
the second end portion of the guide portion has a second-end-portion width and a second-end-portion length,
the second-end-portion width is greater than the first-end-portion width,
the second-end-portion length is greater than the first-end-portion length,
the first end portion of the guide portion and the second end portion of the guide portion both have a square cross-sectional shape,
the guide portion extends away from the foot in a direction toward the coupler,
the first end portion of the guide portion of the drill block comprises a planar end surface,
the drill block has only a single recess,
the single recess is defined in the planar end surface of the drill block and is coaxial with the attachment portion of the drill block,
the first end portion of the guide portion of the drill block is configured to be received between the first pair of parallel legs of the first gang channel when the second end portion of the guide portion is placed in contact with an end surface of each leg of the first pair of parallel legs of the first gang channel,
when the first end portion of the guide portion of the drill block is received between the first pair of parallel legs of the first gang channel, rotation of the guide portion of the drill block relative to the first gang channel is limited by the first pair of parallel legs,
a part of the second end portion of the guide portion is configured to be received between the second pair of parallel legs of the second gang channel when the first end portion of the guide portion of the drill block is received between the second pair of parallel legs of the second gang channel and abuts the fourth surface of the second gang channel, when at least the part of the second end portion of the guide portion is received between the second pair of parallel legs of the second gang channel, rotation of the guide portion of the drill block relative to the second gang channel is limited by the second pair of parallel legs, the foot comprises a first portion, having a first-portion-width, and a second portion having a second-portion-width that is less than the first-portion-width, the first portion of the foot has a first-portion surface that faces the coupler configured to be attached to the drill, the arm assembly is attached to the first portion of the foot, the second portion of the foot extends from the first portion of the foot toward a longitudinal axis of the drill block and is perpendicular to the arm assembly, the second portion of the foot comprises a second-portion surface that faces the coupler configured to be attached to the drill, the first-portion surface and the second-portion surface are substantially parallel to each other, the first portion of the foot and the second portion of the foot each have a length measured in a direction parallel to the longitudinal axis of the drill block, the length of the first portion of the foot is greater than the length of the second portion of the foot, the second-portion surface is located farther away from the coupler than the first-portion surface, the attachment portion has a length measured in the direction parallel to the longitudinal axis of the drill block, the length of the attachment portion is greater than the length of the second portion of the foot, the attachment portion protrudes from the foot in the direction parallel to the longitudinal axis of the drill block, the second portion of the foot extends from the first portion of the foot such that two concave corners are formed in a surface of the foot that is parallel to the longitudinal axis of the drill block, the attachment portion of the drill block is removably coupled directly to the second portion of the foot, and the arm assembly comprises a first tubular structure and a second tubular structure, separated from each other by a gap, the guide portion of the drill block lies in a virtual plane that passes between the first tubular structure and the second tubular structure, without intersecting the first tubular structure and the second tubular structure.

13. The drilling system of claim 12, further comprising:
a motor, configured to rotate the drill;
a control unit, comprising one or more processors and data storage for storing instructions, executable by the one or more processors to control the motor; and
one or more sensors in communication with the control unit.

* * * * *